(12) United States Patent
Ashino

(10) Patent No.: US 9,602,542 B2
(45) Date of Patent: Mar. 21, 2017

(54) SECURITY-FUNCTION-DESIGN SUPPORT DEVICE, SECURITY-FUNCTION-DESIGN SUPPORT METHOD, AND PROGRAM STORAGE MEDIUM

(71) Applicant: NEC Corporation, Tokyo (JP)

(72) Inventor: Yuki Ashino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/432,602

(22) PCT Filed: Jul. 18, 2013

(86) PCT No.: PCT/JP2013/069555
§ 371 (c)(1),
(2) Date: Mar. 31, 2015

(87) PCT Pub. No.: WO2014/061325
PCT Pub. Date: Apr. 24, 2014

(65) Prior Publication Data
US 2015/0281283 A1  Oct. 1, 2015

(30) Foreign Application Priority Data
Oct. 15, 2012 (JP) .................................. 2012-228072

(51) Int. Cl.
*H04L 29/00* (2006.01)
*H04L 29/06* (2006.01)
(Continued)

(52) U.S. Cl.
CPC .............. *H04L 63/20* (2013.01); *G06F 21/57* (2013.01); *G06F 21/577* (2013.01); *H04L 41/0803* (2013.01)

(58) Field of Classification Search
CPC .................................. G06F 17/30; G06F 17/00
(Continued)

(56) References Cited

U.S. PATENT DOCUMENTS

| 7,463,590 | B2 * | 12/2008 | Mualem | H04L 63/1458 370/241 |
| 7,490,287 | B2 * | 2/2009 | Sakurai | G06Q 30/02 715/200 |
| 2007/0174362 | A1 * | 7/2007 | Pham | G06F 21/6209 |

FOREIGN PATENT DOCUMENTS

| JP | 2006-350399 A | 12/2006 |
| JP | 2006-350708 A | 12/2006 |

(Continued)

OTHER PUBLICATIONS

International Search Report, Corresponding to PCT/JP2013/069555, dated Sep. 10, 2013, 2 pages.

*Primary Examiner* — Anthony Brown
*Assistant Examiner* — Michael D Anderson
(74) *Attorney, Agent, or Firm* — Wilmer Cutler Pickering Hale and Dorr LLP

(57) ABSTRACT

A security-function-design support device is provided. The security-function-design support device includes a system-configuration data storage unit that stores information indicating a configuration of a system; an implementation-method storage unit that stores data indicating a security implementation method set for a configuring element of the system in order to implement a security function; an ancillary-function-element storage unit that stores data indicating an ancillary-function element set for the configuring element of the system in order to ensure a function of the security implementation method; an ancillary-function-element definition storage unit that stores a condition for determining a suitability of a setting of a given ancillary-function element; an ancillary-function-element evaluation unit that determines whether the ancillary-function element set for the configuring element of the system is suitable, on the basis of the condition for determining the suitability; and an evalu-
(Continued)

ation-result output unit that outputs a result of the determination by the ancillary-function-element evaluation unit.

13 Claims, 14 Drawing Sheets

(51) Int. Cl.
*G06F 21/57* (2013.01)
*H04L 12/24* (2006.01)

(58) Field of Classification Search
USPC .............................................................. 726/1
See application file for complete search history.

(56) References Cited

FOREIGN PATENT DOCUMENTS

| | | |
|---|---|---|
| JP | 2011-197799 A | 10/2011 |
| JP | 2011-232874 A | 11/2011 |
| JP | 2012-38108 A | 2/2012 |

\* cited by examiner

| CONFIGURING ELEMENT NAME | CONNECTION DESTINATION |
|---|---|
| CLIENT | WWW/AP SERVER |
| WWW/AP SERVER | CLIENT |
| WWW/AP SERVER | DB SERVER |
| DB SERVER | WWW/AP SERVER |

Fig. 5

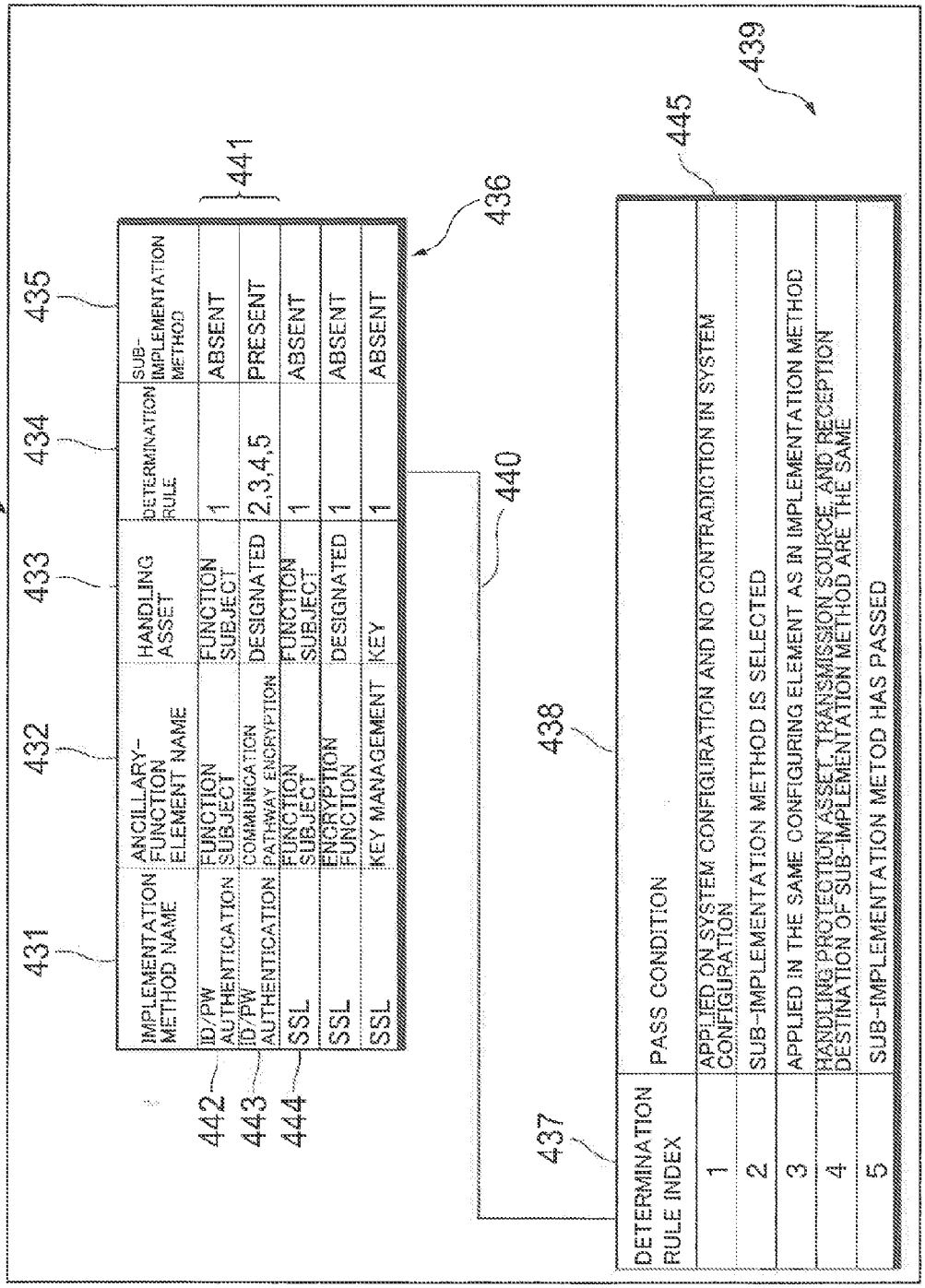

| IMPLEMENTATION METHOD NAME | ANCILLARY-FUNCTION ELEMENT NAME | HANDLING ASSET | DETERMINATION RULE | SUB-IMPLEMENTATION METHOD |
|---|---|---|---|---|
| ID/PW AUTHENTICATION | FUNCTION SUBJECT | FUNCTION SUBJECT | 1 | ABSENT |
| ID/PW AUTHENTICATION | COMMUNICATION PATHWAY ENCRYPTION | DESIGNATED | 2,3,4,5 | PRESENT |
| SSL | FUNCTION SUBJECT | FUNCTION SUBJECT | 1 | ABSENT |
| SSL | ENCRYPTION FUNCTION | DESIGNATED | 1 | ABSENT |
| SSL | KEY MANAGEMENT | KEY | 1 | ABSENT |

| DETERMINATION RULE INDEX | PASS CONDITION |
|---|---|
| 1 | APPLIED ON SYSTEM CONFIGURATION AND NO CONTRADICTION IN SYSTEM CONFIGURATION |
| 2 | SUB-IMPLEMENTATION METHOD IS SELECTED |
| 3 | APPLIED IN THE SAME CONFIGURING ELEMENT AS IN IMPLEMENTATION METHOD |
| 4 | HANDLING PROTECTION ASSET, TRANSMISSION SOURCE, AND RECEPTION DESTINATION OF SUB-IMPLEMENTATION METHOD ARE THE SAME |
| 5 | SUB-IMPLEMENTATION METOD HAS PASSED |

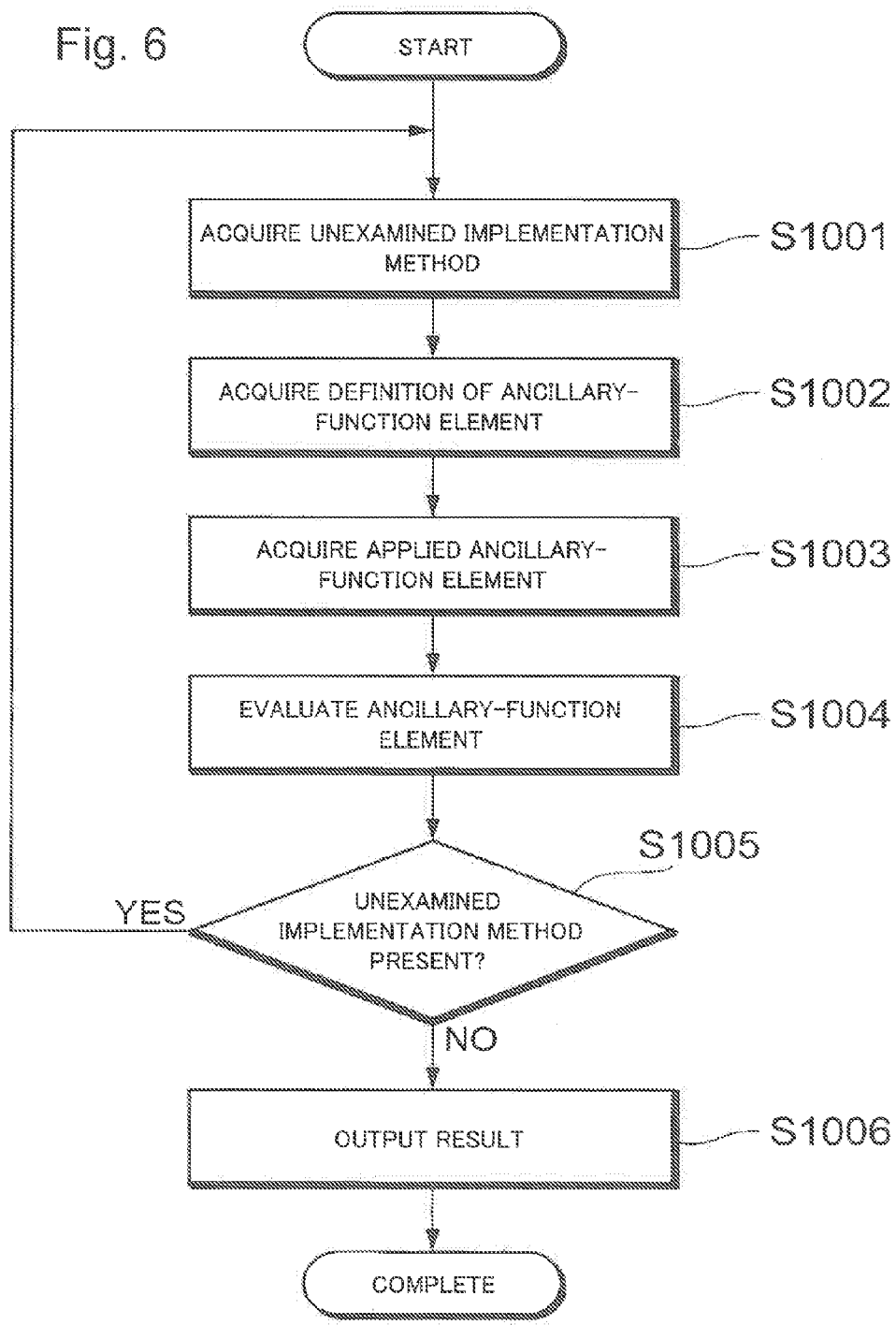

Fig. 13

| ITEM NUMBER | DESCRIPTION |
|---|---|
| 1.1 | ATTACH IDENTITY AUTHENTICATION TO HANDLING DATA OF INFORMATION SYSTEM |
| 1.2 | PROVIDE ENCRYPTION FUNCTION OF COMMUNICATION PATHWAY FOR IDENTITY AUTHENTICATION |
| 1.3 | PROVIDE KEY MANAGEMENT FOR ENCRYPTION FUNCTION |

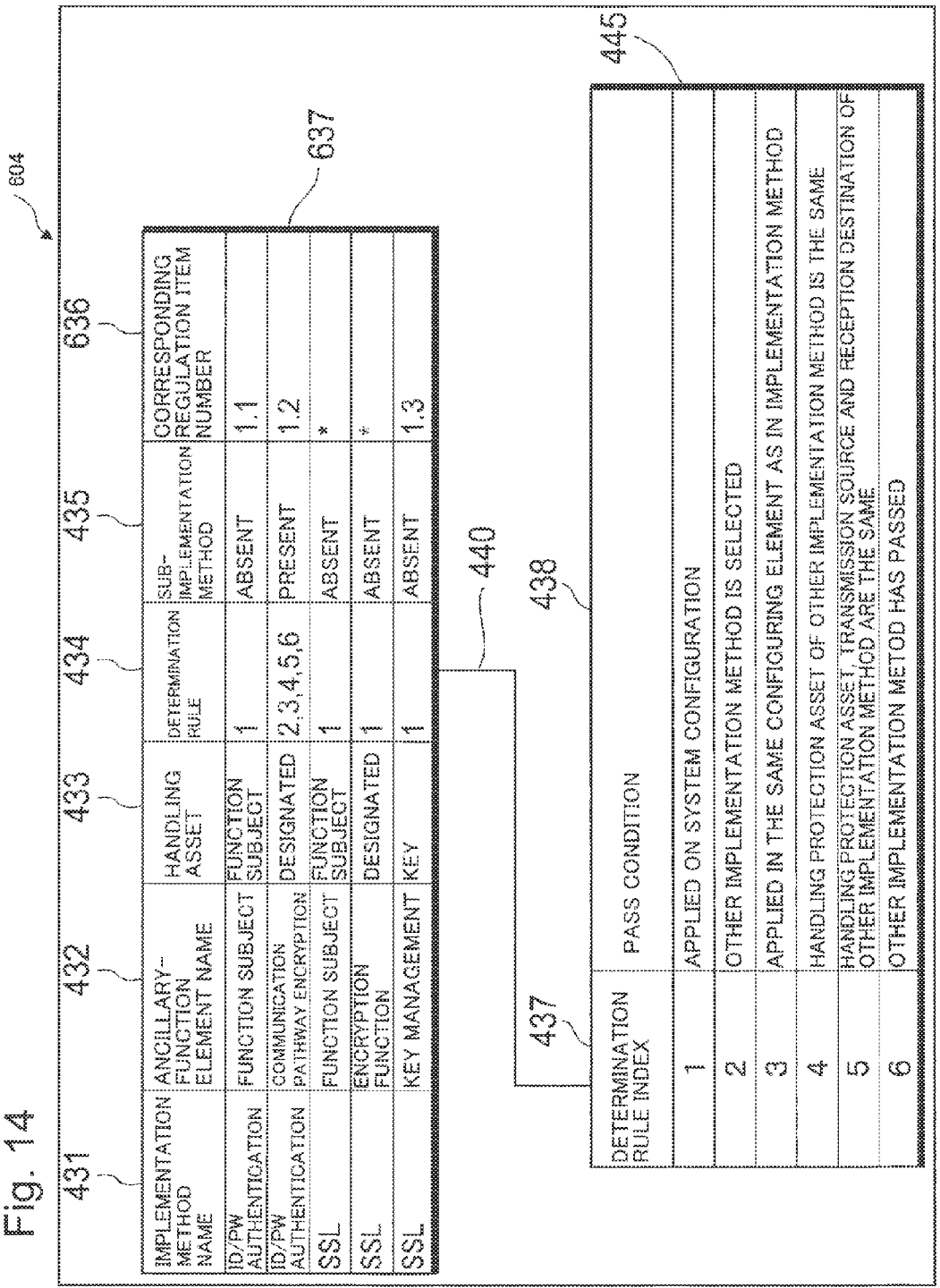

SECURITY-FUNCTION-DESIGN SUPPORT DEVICE, SECURITY-FUNCTION-DESIGN SUPPORT METHOD, AND PROGRAM STORAGE MEDIUM

CROSS-REFERENCE TO RELATED APPLICATIONS

The present application is a national stage application of International Application No. PCT/JP2013/069555 entitled "Security-Function-Design Support Device, Security-Function-Design Support Method, and Program," filed on Jul. 18, 2013, which claims the benefit of priority from Japanese Patent Application No. JP2012-228072, filed on Oct. 15, 2012, the disclosures of which are incorporated herein in their entirety by reference thereto.

TECHNICAL FIELD

The present invention relates to a security-function-design support device, a security-function-design support method, and a program.

BACKGROUND ART

An element for security function design of a computer system includes a specific countermeasure (security implementation method) for implementing a given security function (e.g., subject authentication) and an ancillary countermeasure (ancillary-function element) necessary to cause the security implementation method to function. The ancillary-function element differs depending on a system configuration. When, for example, an authentication method using a user ID and a password is employed as the security implementation method, the necessity of encryption of a communication pathway where the user ID and the password are transmitted and received differs depending on whether the system is online or offline. In other words, in this example, "the encryption of the communication pathway" is an ancillary-function element. It is necessary for a designer of the system to perform designing in just proportion by selecting ancillary-function elements in consideration of a system configuration. Therefore, the system designer needs knowledge of security in general in addition to knowledge of the entire system, and therefore, a large amount of effort is necessary. Insufficient design of the ancillary-function elements causes a security function of the entire system not to work efficiently, which may be, as a result, a cause of occurrence of a security incident.

The security-design support method described in PTL 1 receives a definition of a security environment of an IT product or a system from the user, extracts possible threats based on the defined security environment, and presents the threats to the user. The security-design support method further extracts countermeasure candidates based on a result of a threat selection by the user, presents the extracted countermeasure candidates to the user, and also receives a countermeasure selection from the user.

CITATION LIST

Patent Literature

PTL 1: Japanese Laid-open Patent Publication No. 2006-350708

SUMMARY OF INVENTION

Technical Problem

However, while the method described in PTL 1 can support a selection of a countermeasure for implementing a security function, it is difficult to support a selection of an ancillary-function element for causing the countermeasure to function.

The present invention is intended to evaluate suitability of an application of an ancillary-function element necessary for a security implementation method differing depending on a system configuration and support a design of the ancillary-function element.

A security-function-design support device according to the present invention includes: a system-configuration data storage unit that stores information indicating a configuration of a system;
an implementation-method storage unit that stores data indicating a security implementation method set for a configuring element of the system in order to implement a security function;
an ancillary-function-element storage unit that stores data indicating an ancillary-function element set for the configuring element of the system in order to ensure a function of the security implementation method;
an ancillary-function-element definition storage unit that stores a condition for determining a suitability of a setting of a given ancillary-function element;
an ancillary-function-element evaluation unit that determines whether the ancillary-function element set for the configuring element of the system is suitable, on the basis of the condition for determining the suitability; and
an evaluation-result output unit that outputs a result of the determination by the ancillary-function-element evaluation unit.

Advantageous Effects of Invention

The present invention makes it possible to evaluate suitability of an application of an ancillary-function element necessary for a security implementation method differing depending on a system configuration and support a design of the ancillary-function element.

BRIEF DESCRIPTION OF DRAWINGS

FIG. 5 is a chart illustrating an example of data stored on an ancillary-function-element definition storage unit according to the first exemplary embodiment of the present invention.

FIG. 6 is a flowchart of operations of the security-function-design support device according to the first exemplary embodiment of the present invention.

FIG. 13 is a chart illustrating an example of data stored on a regulation data storage unit according to the fourth exemplary embodiment of the present invention.

FIG. 14 is a chart illustrating an example of data stored on an ancillary-function-element definition storage unit according to the fourth exemplary embodiment of the present invention.

DESCRIPTION OF EMBODIMENTS

First Exemplary Embodiment

Security Function Design

Of the functions (provided functions) provided by a computer system, there is, for example, a function for providing information only to a specific user. However, a malicious third party (attacker), performing an illegal operation (attack) against to the provided function, may acquire the information that is not allowed to be acquired under normal circumstances.

Therefore, in order to ensure the provided function from the attacker, a function (security function) for ensuring the provided function is needed. Upon designing a system, designing where and how the security function is applied (security function design) is necessary.

In the security function design, initially, an information asset to be protected is determined. For example, information provided to a specific user is cited as the information asset.

Then, it is necessary to study a security function needed for protecting the information asset. For example, enabling the specific user to be authenticated (subject authentication) is cited.

Then, a method (security implementation method) such as software or the like required for implement the security function is selected. For example, an authentication system (ID/PW authentication) may be selected using an ID that is an identification code for identifying a user and a password only be known by the user.

Then, there is a possibility that the security implementation method itself may be attacked by an attacker and therefore, a function (ancillary-function element) for ensuring the security implementation method is also needed. For example, in the above ID/PW authentication, the ID and the PW move back and forth on a communication pathway and therefore, encryption of the communication pathway is needed as an ancillary function. However, the ancillary function is not always necessary depending on a system configuration. For example, in a computer system without any communication function, an encryption function for the communication pathway is unnecessary. In this manner, in security function design, it is necessary to set appropriately in just proportion ancillary-function elements that vary depending on a system configuration.

(Configuration of Security-Function-Design Support Device)

A configuration of a security-function-design support device according to a first exemplary embodiment of the present invention will now be described below.

Figure 1:
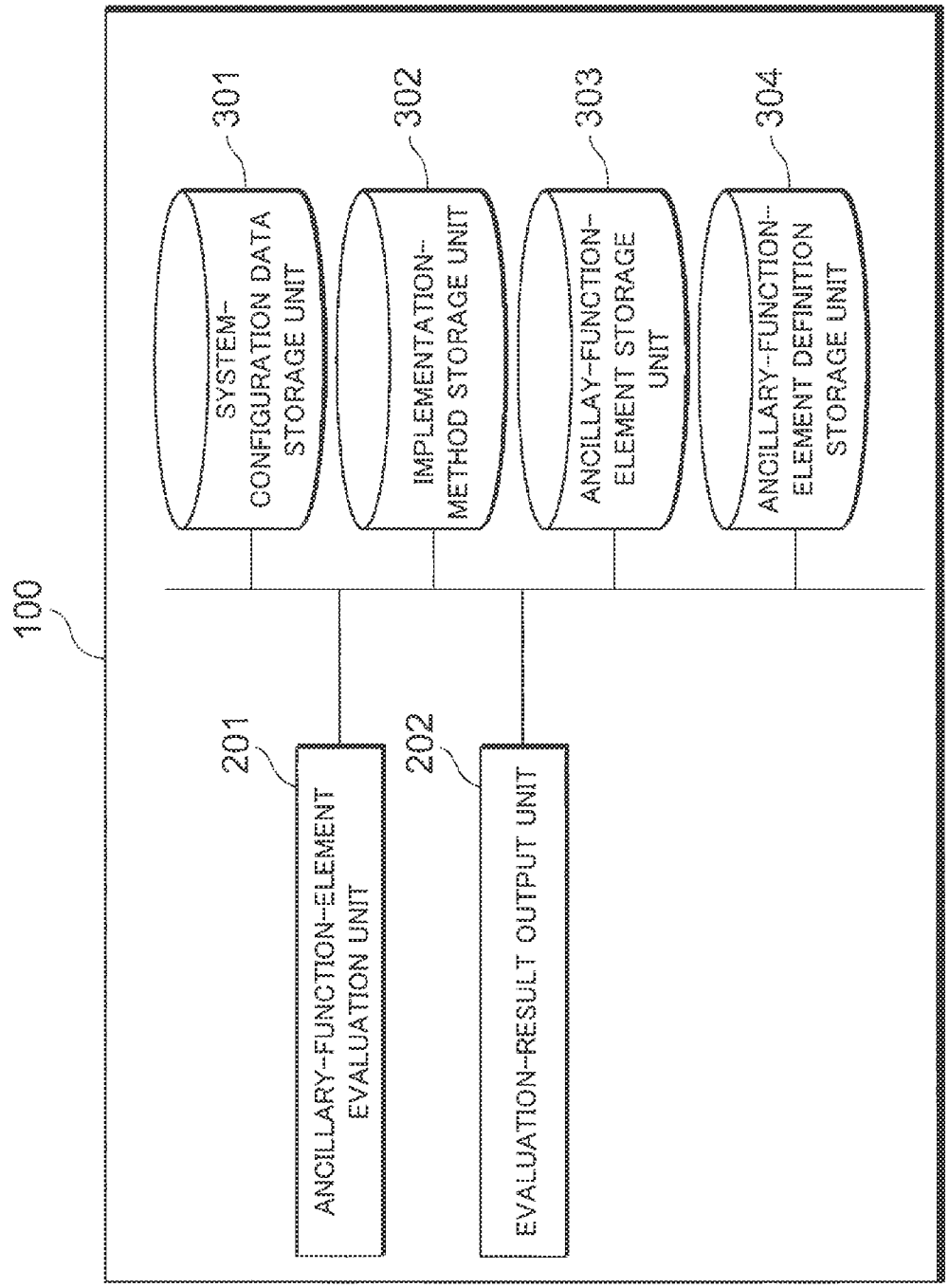
FIG. 1 is a block diagram illustrating a configuration of a security-function-design support device according to a first exemplary embodiment of the present invention.

FIG. 1 is a block diagram illustrating a configuration of a security-function-design support device 100 according to the first exemplary embodiment of the present invention. As illustrated in the figure, the security-function-design support device 100 includes an ancillary-function-element evaluation unit 201, an evaluation-result output unit 202, a system-configuration data storage unit 301, an implementation-method storage unit 302, an ancillary-function-element storage unit 303, and an ancillary-function-element definition storage unit 304.

For the security-function-design support device 100, a dedicated or general computer including a CPU, a memory such as a ROM, a RAM, and the like, an external storage device storing a variety of information, an input interface, an output interface, a communication interface, and a bus connecting these is applicable. Furthermore, the security-function-design support device 100 may include a single computer or a plurality of computers connected to each other via a communication line.

The ancillary-function-element evaluation unit 201 and the evaluation-result output unit 202 are equivalent to a module of functions implemented by executing a predetermined program stored on the ROM or the like by the CPU. The system-configuration data storage unit 301, the implementation-method storage unit 302, the ancillary-function-element storage unit 303, and the ancillary-function-element definition storage unit 304 are implemented by the external storage device. The external storage device may be connected to the security-function-design support device 100 via a network or the like.

Figure 2:
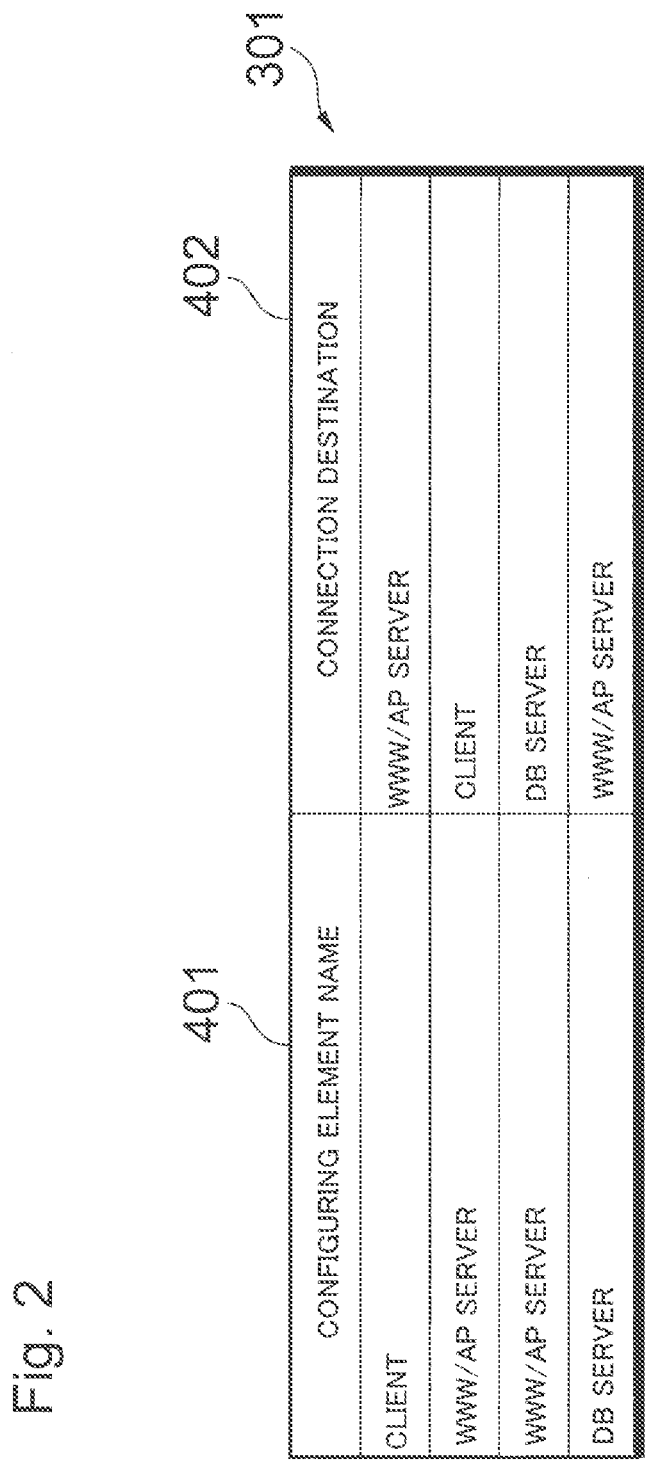
FIG. 2 is a chart illustrating an example of data stored on a system-configuration data storage unit according to the first exemplary embodiment of the present invention.

The system-configuration data storage unit 301 stores information of a configuration of a system. FIG. 2 is a chart illustrating an example of system configuration data stored in the system-configuration data storage unit 301. As illustrated in FIG. 2, the system configuration data includes a configuring element name 401 and a connection destination 402 as data items. The configuring element name 401 is a name of a configuring element configuring a system to be targeted for security function design. The connection destination 402 represents a configuring element connected to each configuring element via the communication line.

The system in the example of FIG. 2 includes three configuring elements (a client, a WWW/AP server, and a DB server), and there is a non-directional connection relation each between the client and the WWW/AP server and between the WWW/AP server and the DB server. Regarding system configuration data of the system, as illustrated in FIG. 2, (the client, the WWW/AP server, and the DB server) are set as configuring element names 401 and recorded as a connection destination 402 of each configuring element. In this example, it shows that the client and the DB server are connected via the WWW/AP server.

Figure 3:
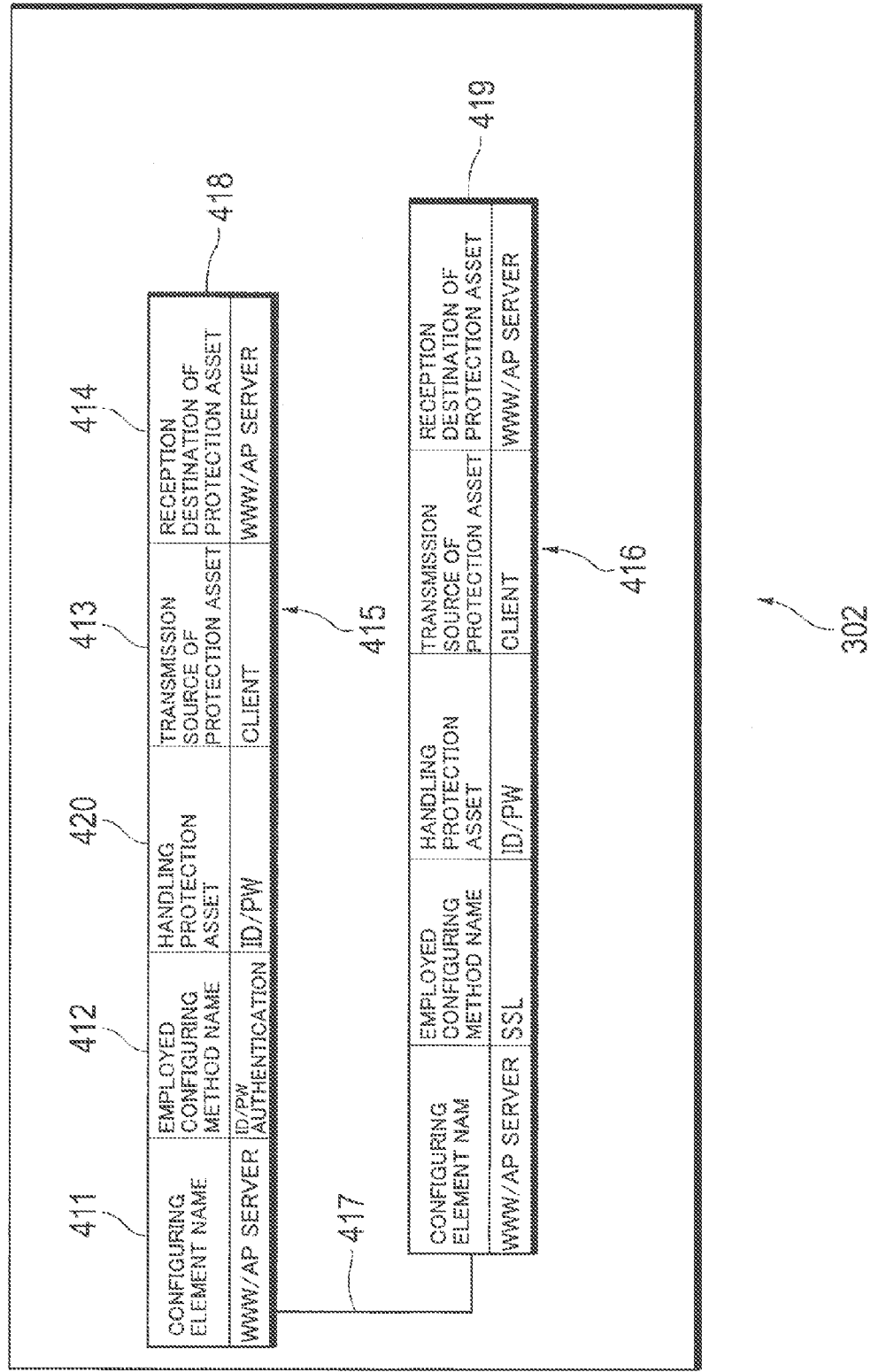
FIG. 3 is a chart illustrating an example of data stored on an implementation-method storage unit according to the first exemplary embodiment of the present invention.

The implementation-method storage unit 302 stores data indicating a security implementation method for implementing a security function which is set for a configuring element of the system. FIG. 3 is a chart illustrating an example of data stored in the implementation-method storage unit 302. As illustrated in FIG. 3, the implementation-method storage unit 302 includes a table 415 including a configuring element name 411, an employed implementation method name 412, a protection asset 420 to be handled by an implementation method, a transmission source 413 of the protection asset to be handled by the implementation method, and a reception destination 414 of the protection asset to be handled by the implementation method.

The table 415 may have a hierarchical structure. When, for example, an ancillary-function element for ensuring a given security implementation method is implemented using other security implementation method, a table 416 is created using a record 418 of the table 415 as a parent. Further, a link structure 417 is set so as to be able to trace the table 416 from the record 418 as the parent.

In the example of FIG. 3, in a WWW/AP server, a security implementation method that is ID/PW authentication is employed. A protection asset handled in the ID/PW authentication is an ID/PW; a transmission source of the protection asset is a client; and a reception destination of the protection asset is the WWW/AP server (table 415). A security implementation method for implementing an ancillary-function element of the ID/PW authentication is SSL; a transmission source of a protection asset handled by the SSL is a client; and a reception destination of the protection asset is the WWW/AP server (table 416). The link structure 417 is set so as to be able to trace the table 416 from the parent record 418.

Figure 4:
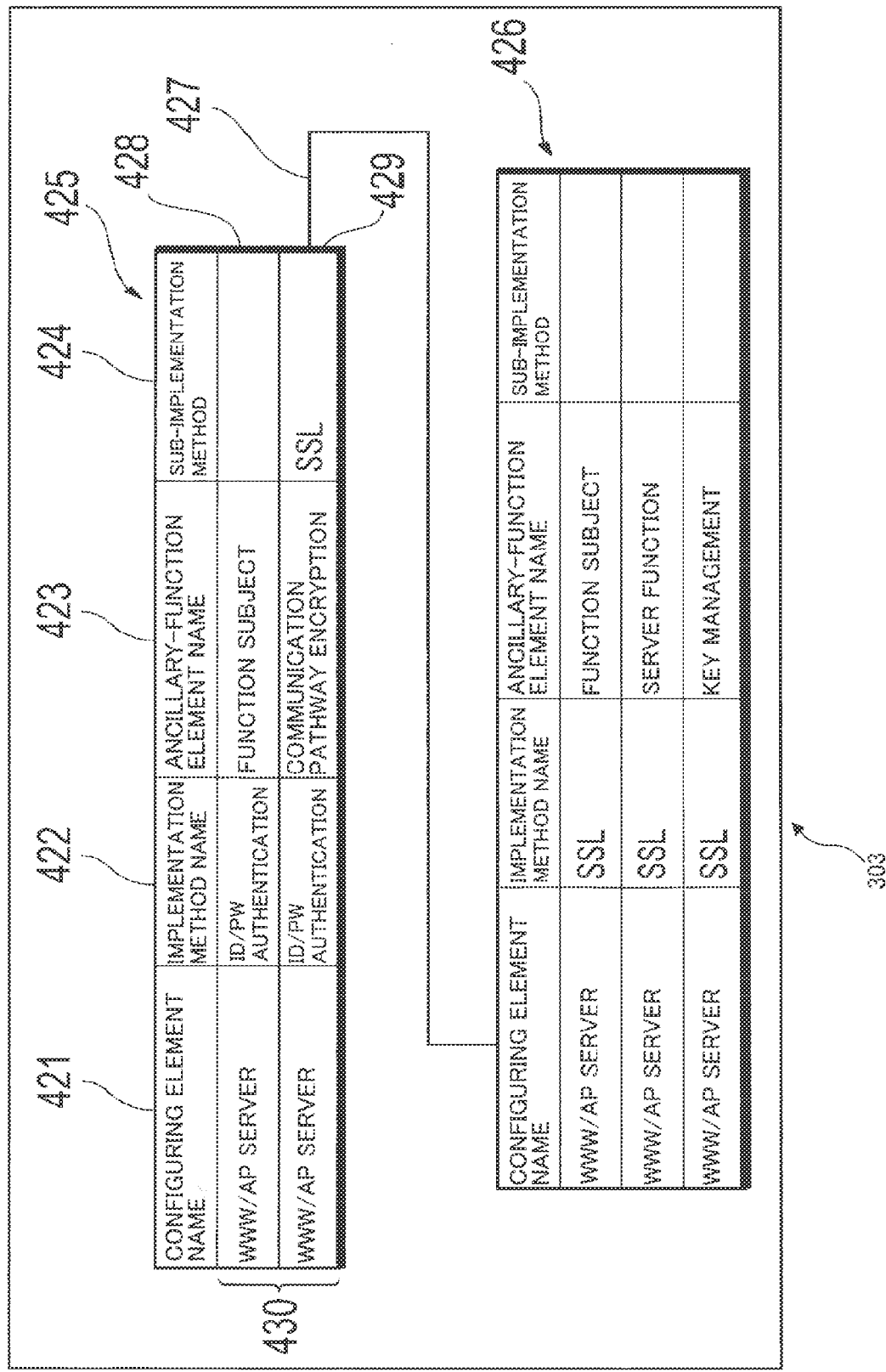
FIG. 4 is a chart illustrating an example of data stored on an ancillary-function-element storage unit according to the first exemplary embodiment of the present invention.

The ancillary-function-element storage unit 303 is set for a configuring element of a system and stores data indicating an ancillary-function element set to ensure a function of a security implementation method. FIG. 4 is a chart illustrating an example of data stored in the ancillary-function-element storage unit 303. As illustrated in FIG. 4, the ancillary-function-element storage unit 303 includes a configuring element name 421, an implementation method name 422 of a security function applied for a configuring element, an ancillary-function element name 423, and a table 425 including an implementation method (sub-implementation method) 424 of a security function for implementing the ancillary-function element.

The table 425 may have a hierarchical structure. When, for example, one ancillary-function element is implemented using other security implementation method, a table 426 is created using a record 429 as a parent corresponding to the table 425, and a link structure 427 is set so as to be able to trace the child table 426 from the parent record 429.

In the example of FIG. 4, for a WWW/AP server, ID/PW authentication is employed as a security implementation method. For the ID/PW authentication, "a function subject" and "communication pathway encryption" that are ancillary-function elements are applied (table 425). The communication pathway encryption is implemented by other security implementation method "SSL" and therefore, SSL is registered as the sub-implementation method 424. The link structure 427 is set for the child table 426 using the record 429 as a parent. The table 426 includes information on the ancillary-function elements of the security implementation method "SSL".

The ancillary-function-element definition storage unit 304 stores information of an ancillary-function element for ensuring a function of a given security implementation method. FIG. 5 is a chart illustrating an example of data stored on the ancillary-function-element definition storage unit 304. As illustrated in FIG. 5, the ancillary-function-element definition storage unit 304 includes a security implementation method name 431, an ancillary-function element name 432 for ensuring a security implementation method, a protection asset name (handling asset) 433 handled by the ancillary-function element, a determination rule 434 for determining a pass/fail of the ancillary-function element, and a table 436 including information (sub-implementation method) 435 indicating whether other security implementation method for implementing the ancillary-function element exists. The determination rule 434 is linked to a sub-table 439. The sub-table 439 includes a determination rule index 437 and a pass condition 438, and a link structure 440 is set so as to be able to trace the sub-table 439 from the determination rule 434.

In the example of FIG. 5, in the case of ID/PW authentication, those two, a function subject and communication pathway encryption, are defined as ancillary functions. When looking at the record 442 of the function subject, the handling asset 433 is a function asset. This means a function itself of ID/PW authentication that is a security implementation method. When the handling asset 433 is "designated," a protection asset designated by the implementation-method storage unit 302 is allotted. When the determination rule is designated, for example, as "1," the link structure 440 is traced, and a record in which the determination rule index 437 in the sub-table 439 includes "1" is referred to. In the example of FIG. 5, "applied on a system configuration and no contradiction in the system configuration" is a determination rule. When the sub-implementation method 435 is designated as "present," it is indicated that an ancillary function is implemented by other implementation method, and the case of "absent" indicates that the ancillary function is not implemented by other implementation method.

(Operations of Security-Function-Design Support Device)

Next, operations of the security-function-design support device according to the first exemplary embodiment of the present invention will be described.

The system-configuration data storage unit 301, the implementation-method storage unit 302, and the ancillary-function-element storage unit 303 store respectively: system configuration data previously input by a system designer, data of a security implementation method set for a configuring element of a system, and data of an ancillary-function element set for the configuring element of the system. The ancillary-function-element definition storage unit 304 stores definition information of ancillary-function elements determined on the basis of various security regulation. In the present exemplary embodiment, the case where pieces of data illustrated in FIGS. 2 to 5 are stored on the respective storage units will be described as an example.

FIG. 6 is a flowchart of operations of the security-function-design support device 100 according to the first exemplary embodiment.

Initially, the ancillary-function-element evaluation unit 201 acquires one unexamined implementation method from the implementation-method storage unit 302 (step S1001). Specifically, from the table 415 illustrated in FIG. 3, an unexamined record 418 (hereinafter, expressed as an implementation method record employed for a configuring element) is selected.

The ancillary-function-element evaluation unit 201 acquires a definition record of an ancillary-function element of the implementation method selected in step S1001 from an ancillary-function-element definition storage unit 304 (step S1002). When, for example, implementation method name 412 which is employed by the record acquired in step S1001 is "ID/PW authentication," from the table 436 illustrated in FIG. 5, the implementation method name 431 acquires a record group 441 (hereinafter, expressed as an ancillary-function-element definition record group) which is "ID/PW authentication".

The ancillary-function-element evaluation unit 201 acquires a record group (hereinafter, expressed as an applied ancillary-function-element record group) in which the content of the implementation method name 412 which is employed by the record acquired in step S1001 and the content of the implementation method name 422 are the same, from the table 425 of the ancillary-function-element storage unit 303 (step S1003). Specifically, when the employed implementation method name 412 of the record acquired in step S1001 is "ID/PW authentication," a record group 430 illustrated in FIG. 4 is acquired.

On the basis of the data acquired in step S1002 and step S1003, the ancillary-function-element evaluation unit 201 evaluates the ancillary-function element (step S1004).

Figure 7:
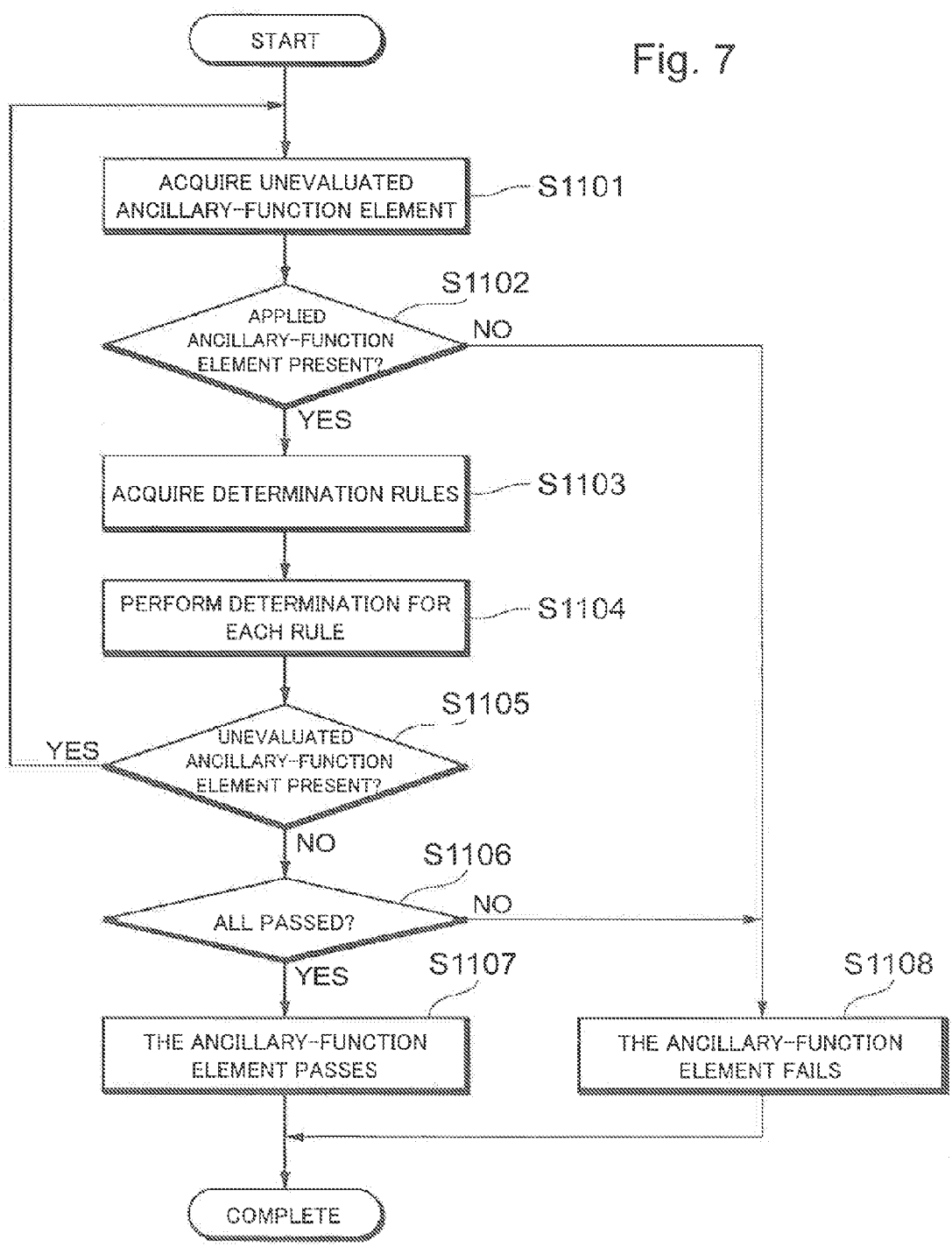
FIG. 7 is a flowchart of operations for evaluating an ancillary-function element according to the first exemplary embodiment of the present invention.

FIG. 7 is a flowchart of operations for evaluating an ancillary-function element.

Initially, the ancillary-function-element evaluation unit 201 acquires one record (hereinafter, expressed as an evaluation target ancillary-function-element record) from the ancillary-function-element definition record group acquired in step S1002 of FIG. 6 (step S1101).

Then, the ancillary-function-element evaluation unit 201 determines whether a record exists or not (hereinafter, expressed as an applied ancillary-function-element record) in which the implementation method name 422 and the ancillary-function element name 423 coincide with an implementation method name 431 and an ancillary-function element name 432 of the evaluation target ancillary-function-element record acquired in step S1101, out of the applied ancillary-function-element record group acquired in step S1003. When the applied ancillary-function-element record exists, the processing transfers to step S1103, and when the record does not exist, the processing transfers to step S1108.

Using FIGS. 4 and 5, specific description is made below. In step S1101, the evaluation target ancillary-function-element record 442 is selected. The implementation method name 431 of the record 442 is "ID/PW authentication" and the ancillary-function element name 432 is "function subject". The ancillary-function-element evaluation unit 201 acquires a record having the implementation method name 422 and the ancillary-function element name 423 having the same contents from the applied ancillary-function-element record group acquired in step S1003. In the example of FIG. 4, a record 428 corresponds. Therefore, the record 428 is an applied ancillary-function-element record.

In step S1103, the ancillary-function-element evaluation unit 201 traces the link structure 440 on the basis of a determination rule 434 of the evaluation target ancillary-function-element record acquired in step S1101 and acquires at least one record (hereinafter, expressed as a determination rule record group) in which a pass condition is described from the table 439.

Using FIG. 5, specific description is made below. The determination rule 434 of the record 442 acquired in step S1101 is "1". The evaluation-result output unit 202 traces the link structure 440 and acquires a record 445 in which the determination rule index 437 has the same content as the determination rule 434 from the table 439. The ancillary-function-element evaluation unit 201 acquires the content "applied on a system configuration and no contradiction in the system configuration" of the pass condition 438 of the record 445 as a determination rule.

The ancillary-function-element evaluation unit 201 performs a pass/fail determination of the ancillary-function element on the basis of the determination rule acquired in step S1103. When there are several determination rules, the evaluation based on of all of the determination rules is performed. (step S1104).

The pass/fail determination of the ancillary-function element is specifically described below using FIGS. 4 and 5. The evaluation target ancillary-function-element record 442 is acquired in step S1101, and the applied ancillary-function-element record 428 is acquired in step S1102. Further, in step S1103, the record 445 is acquired as a determination rule record group. As a result, only one determination rule is present, indicating "applied on a system configuration and no contradiction in the system configuration".

"Applied on a system configuration and no contradiction in the system configuration" means that when an applied ancillary-function-element record is present, the configuring element name 411 of the record acquired in step S1001 is present in the configuring element name 401 of the system-configuration data storage unit 301, and the transmission source 413 of the protection asset and the reception destination 414 of the protection asset can communicate with each other, the ancillary-function element can pass.

The configuring element name 421 of the applied ancillary-function-element record 428 is "WWW/AP server". Referring to the system-configuration data storage unit 301 of FIG. 2, a record in which the configuring element name 401 is "WWW/AP server" exists. In addition, from FIG. 2, "the client" and "the WWW/AP server" are connected and therefore, they can communicate with each other.

When in step S1101, the evaluation target ancillary-function-element record 443 is acquired, the applied ancillary-function-element record 429 is acquired in step S1102. The determination rule 434 of the record 443 is "2, 3, 4, and 5," and therefore, in step S1103, as determination rules, "a sub-implementation method is selected," "applied in the same configuring element as in an implementation method," "a handling protection asset, a transmission source, and a reception destination of a sub-implementation method are the same," and "a sub-implementation method has passed" are acquired.

The ancillary-function-element evaluation unit 201 performs the evaluation on the basis of the each determination rule. Initially, the evaluation regarding "a sub-implementation method is selected" is described. SSL has been set in the sub-implementation method 424 of the record 429. In this case, the ancillary-function-element evaluation unit 201 traces the link structure 417 from the implementation method record 418 to the child table 416, the implementation method record 418 being employed for the configuring element. When a record (hereinafter, expressed as a sub-implementation method record) in which the employed implementation method name 412 is "SSL" is present in the child table 416, the result of the evaluation is "pass".

Next, the evaluation of "applied in the same configuring element as in an implementation method" is described. The ancillary-function-element evaluation unit 201 traces the link structure 417 to the child table 416, from "the implementation method record (418) which is employed by the configuring element" acquired in step 1001. When a record having the same implementation method name 422 as the sub-implementation method 424 of "the applied ancillary-function-element record (429)" is present in the child table 416, the result of the evaluation is "pass".

Next, the evaluation of "a handling protection asset, a transmission source, and a reception destination of a sub-implementation method are the same" is described. Initially, when the handling asset 433 of "an evaluation target ancillary-function-element record (443)" is set as "designated," the handling asset 433 is assumed to have the same value as a protection asset described in the handling asset 420 of "an implementation method record (418) which is employed by a configuring element". Upon being "ID/PW" for this value, for example, when the implementation method name 412 of "a sub-implementation method record (419)" is "ID/PW" and the transmission source 413 of a protection asset of "the sub-implementation method record (419) and the reception destination 414 of the protection asset are the same as the transmission source 413 of a protection asset of "the implementation method record (418) which is employed by the configuring element" and the reception destination 414 of the protection asset, the result of the evaluation is "pass".

Next, description on the evaluation of "a sub-implementation method has passed" is made below. When operations are executed from step S1001 with the implementation method to be examined is designated as SSL and the result is determined as "pass", the result of the evaluation is "pass".

The determination rule is not limited to examples described in FIG. 5.

In step S1105, when an unevaluated ancillary-function element is present in "the ancillary-function-element definition record group" acquired in step S1002, the ancillary-function-element evaluation unit 201 transfers the processing to step S1101. When no unevaluated ancillary-function element is present, the ancillary-function-element evaluation unit 201 transfers the processing to step S1106.

In step S1106, when all the ancillary-function elements are evaluated to pass, the ancillary-function-element evaluation unit 201 transfers the processing to step S1107, and when a fail ancillary-function element exists, the ancillary-function-element evaluation unit 201 transfers the processing to step S1108.

In step S1107, the ancillary-function-element evaluation unit 201 determines that the design of the ancillary-function element regarding the present implementation method is suitable and then completes the processing (step S1107).

In step S1108, the ancillary-function-element evaluation unit 201 determines that the design of the ancillary-function element regarding the present implementation method is unsuitable and then completes the processing (step S1108).

A return is made to step S1005 of FIG. 6, and when an unexamined implementation method exists, the ancillary-function-element evaluation unit 201 returns the processing to step S1001 again. When examinations for all the implementation methods complete, the ancillary-function-element evaluation unit 201 transfers the processing to step S1006.

In step S1006, the evaluation-result output unit 202 outputs an evaluation result for each implementation method described in the implementation-method storage unit 302.

With the above, the operations of the security-function-design support device according to the first exemplary embodiment of the present invention complete.

As described above, according to the first exemplary embodiment of the present invention, the ancillary-function-element evaluation unit 201 is configured to acquire information of an ancillary-function element previously set by a designer from the implementation-method storage unit 302 and to determine the suitability of the ancillary-function element with reference to information of the system-configuration data storage unit 301 and the implementation-method storage unit 302 on the basis of the pass conditions acquired from the ancillary-function-element definition storage unit 304.

This makes it possible to support determinations of suitability of ancillary-function elements that vary necessity depending on a system configuration when designing security-function of computer systems.

Second Exemplary Embodiment

Figure 8:
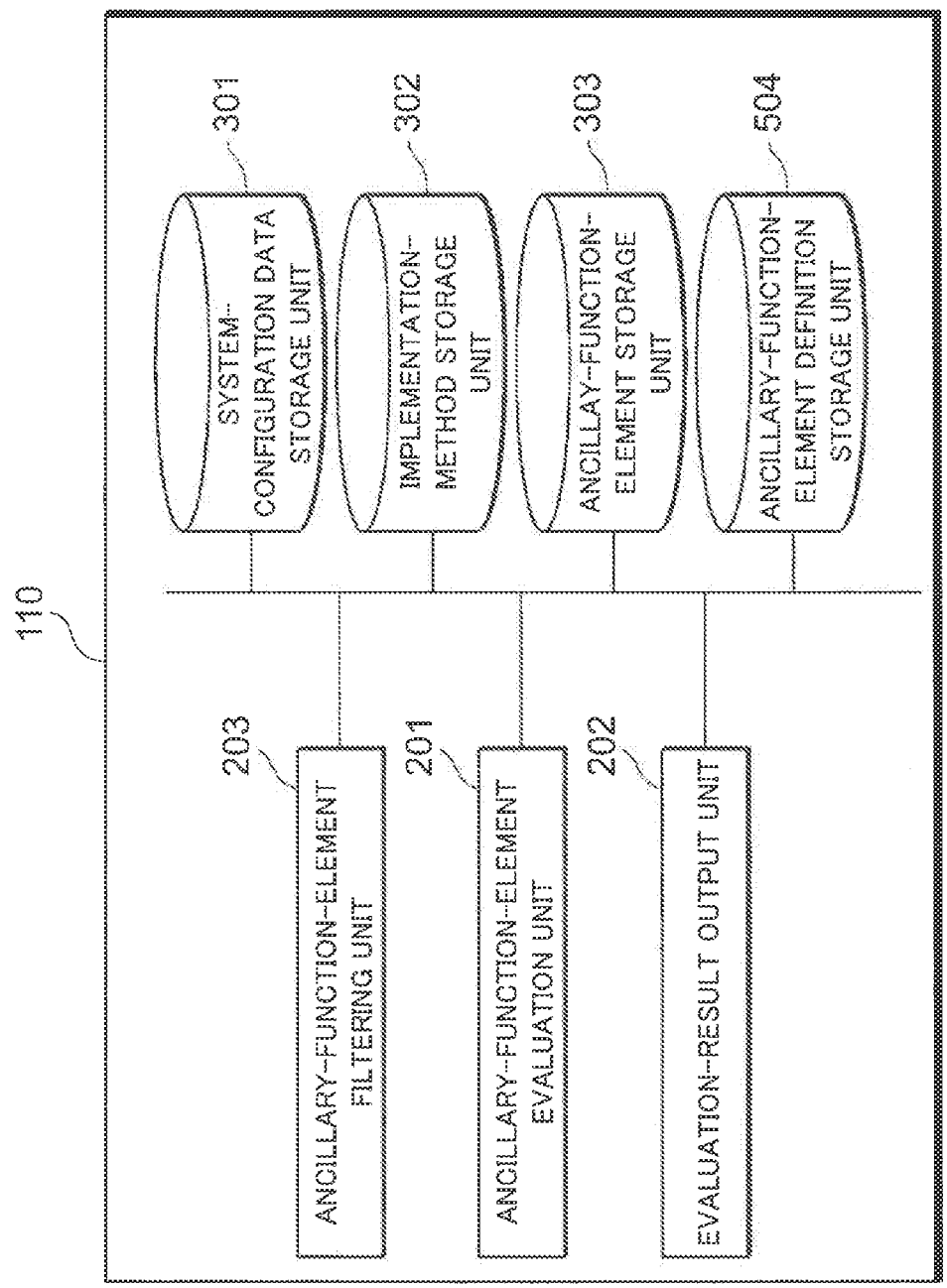
FIG. 8 is a block diagram illustrating a configuration of a security-function-design support device according to a second exemplary embodiment of the present invention.

FIG. 8 is a block diagram illustrating a configuration of a security-function-design support device 110 according to a second exemplary embodiment of the present invention. The same symbols as in FIG. 1 indicate the same configuring elements. As illustrated in the figure, the security-function-design support device 110 further includes an ancillary-function-element filtering unit 203. Information stored in an ancillary-function-element definition storage unit 504 is different from that of the ancillary-function-element definition storage unit 304 of the first exemplary embodiment.

Figure 9:
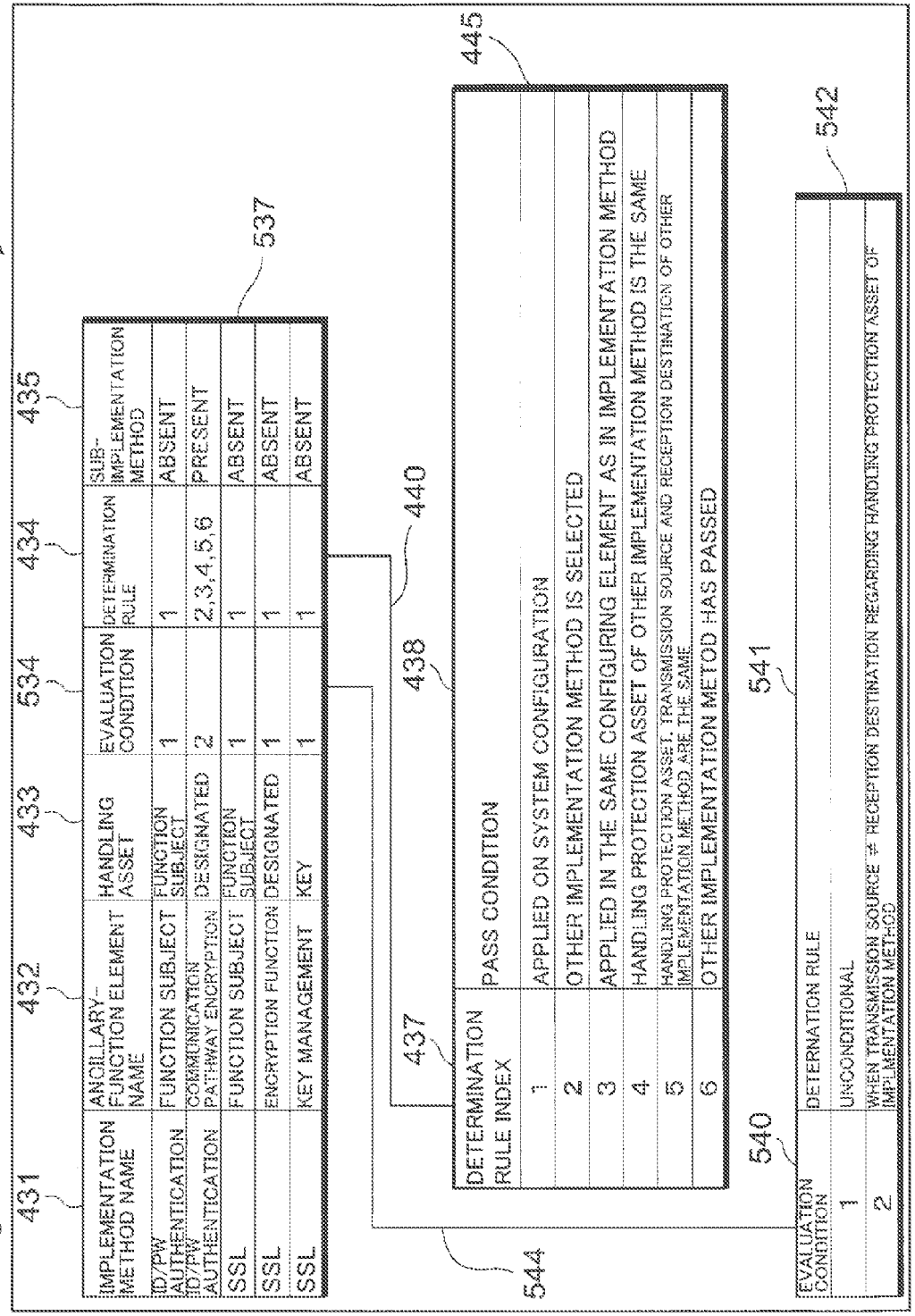
FIG. 9 is a chart illustrating an example of data stored on an ancillary-function-element definition storage unit according to the second exemplary embodiment of the present invention.

FIG. 9 is a chart illustrating an example of data stored in the ancillary-function-element definition storage unit 504. The same symbols as in FIG. 5 indicate the same items. As illustrated in FIG. 9, a table 537 includes an evaluation condition 534 in addition to the data items of the table 436 of the first exemplary embodiment. The evaluation condition 534 is linked to a sub-table 542. The sub-table 542 includes an evaluation condition 540 and a determination condition 541, and a link structure 544 is set so as to be able to trace the sub-table 542 from the evaluation condition 534. The determination condition 541 refers to a condition for determining whether to evaluate the ancillary-function element.

Figure 10:
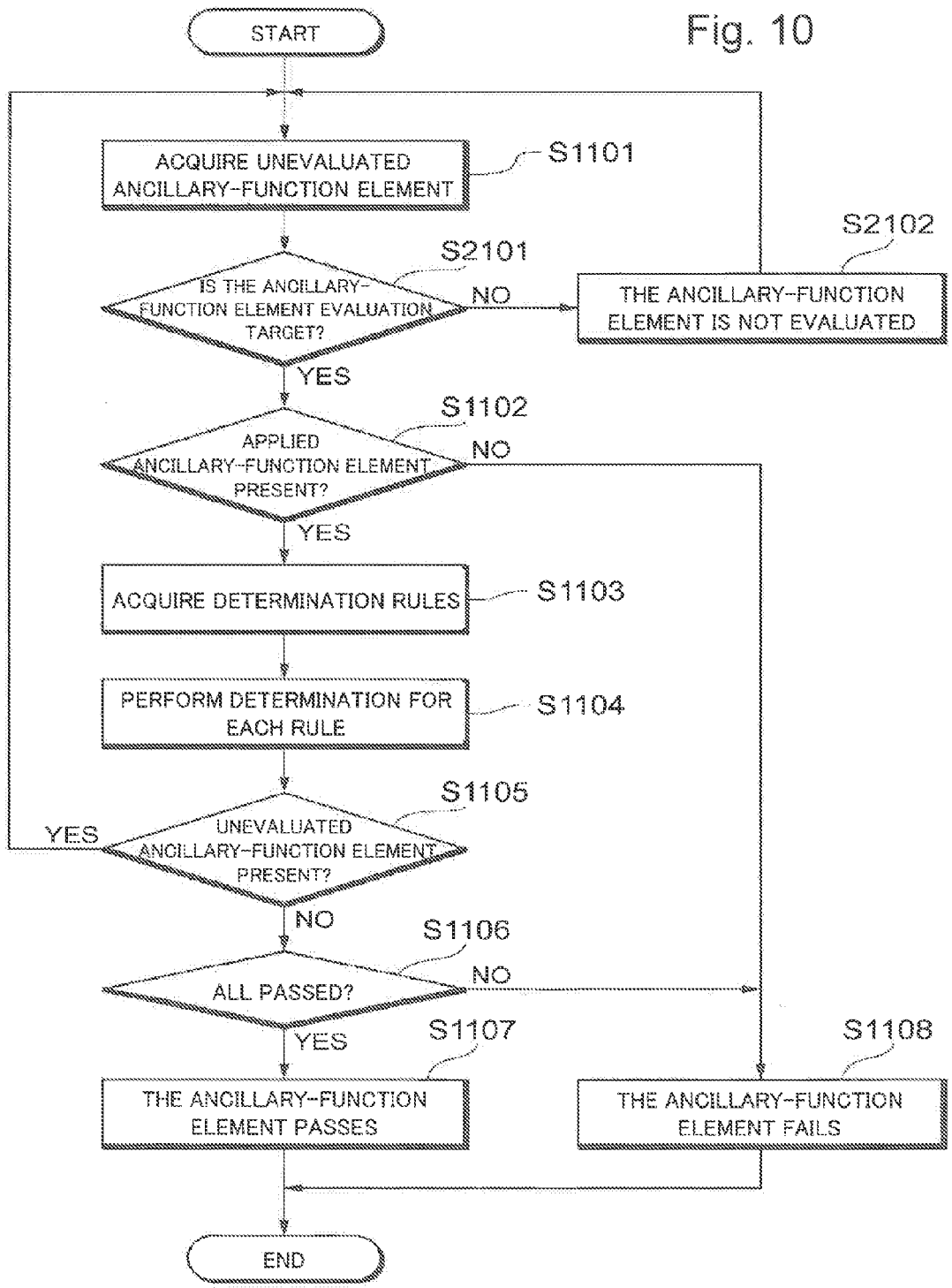
FIG. 10 is a flowchart of operations for evaluating an ancillary-function element according to the second exemplary embodiment of the present invention.

FIG. 10 shows a flowchart of operations for evaluating an ancillary-function element regarding the security-function design support device 110 according to the second exemplary embodiment. The same symbols as in FIG. 7 indicate a step for executing the same processing. Other operations are the same as the operations of the first exemplary embodiment illustrated in FIG. 6.

In step S2101, the ancillary-function-element filtering unit 203 refers to the evaluation condition 534 of "the evaluation target ancillary-function-element record" acquired in step S1101 and then refers to the table 542 by tracing the link structure 544. In case of "2" as the evaluation condition 534, for example, referring the evaluation condition 540 of the sub-table 542, the determination condition 541 is designated as "when a transmission source ≠ a reception destination regarding a handling protection asset of an implementation method". In this case, when the transmission source 413 of a protection asset of "the implementation method record employed for a configuring element" acquired in step S1001 of FIG. 6 and the reception destination 414 of the protection asset are different, the ancillary-function-element filtering unit 203 designates the ancillary-function element as an evaluation target and transfers the processing to step S1102. On the other hand, when the transmission source 413 of the protection asset and the reception destination 414 of the protection asset are the same, the ancillary-function-element filtering unit 203 does not designate the ancillary-function element as an evaluation target and transfers the processing to step S2102.

As described above, according to the present exemplary embodiment, on the basis of predetermined determination conditions, ancillary-function elements to be evaluated are filtered in advance and therefore, it is possible to shorten the evaluation time and reduce an amount of work of system engineers.

Third Exemplary Embodiment

Figure 11:
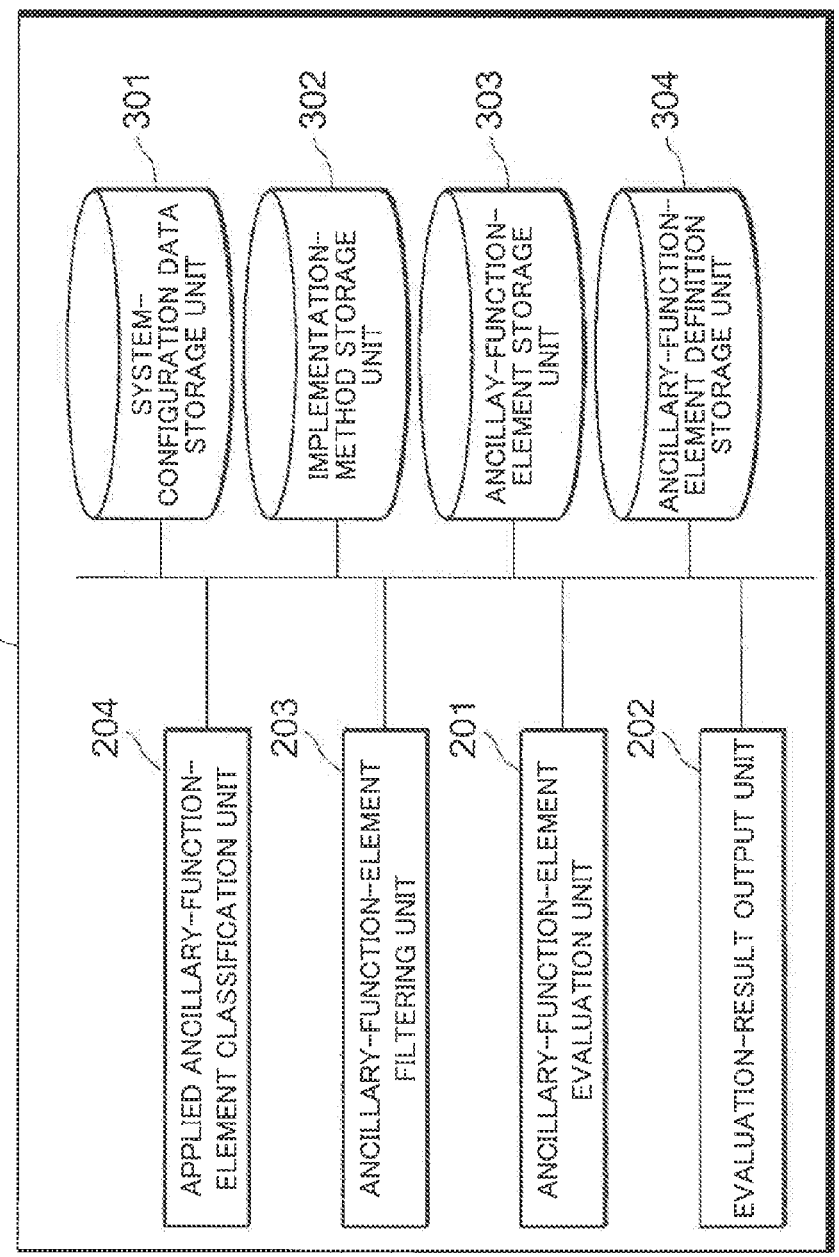
FIG. 11 is a block diagram illustrating a configuration of a security-function-design support device according to a third exemplary embodiment of the present invention.

FIG. 11 is a block diagram illustrating a configuration of a security-function-design support device 120 according to a third exemplary embodiment of the present invention. The same symbols as in FIG. 1 or 8 indicate the same configuring elements. As illustrated in the figure, the security-function-design support device 120 further includes an applied ancillary-function-element classification unit 204.

The applied ancillary-function-element classification unit 204 refers to a means for classifying a record stored in the ancillary-function-element storage unit 303 into data 302 which is assembled by implementation methods employed by a configuring element and ancillary-function-element data 303 which is applied for the configuring element.

When a record (hereinafter, expressed as a function subject record) in which the ancillary-function-element name 423 is designated as "function subject" is present in the record of the ancillary-function-element storage unit 303, the classification method searches the implementation method storage unit 302 using the configuring element name 421 and the implementation method name 422 of the record as keys. When a record including the configuring element name 411 and the employed implementation method name 412 that coincide with the search keys does not exist in the implementation method storage unit 302, the applied ancillary-function-element classification unit 204 considers that the configuring element name 421 of the function subject record employs the implementation method name 422 and then adds this record to the implementation-method storage unit 302.

However, it is difficult to identify a child implementation method (an implementation method for implementing an ancillary-function element of a given security implementation method) in this way. Therefore, after the operations described above, the applied ancillary-function-element classification unit 204 searches the ancillary-function-element storage unit 303 using an implementation method name as a key. When data is recorded in the sub-implementation method 424 of an extracted record, the applied ancillary-function-element classification unit 204 designates the sub-implementation method as the child implementation method.

As described above, according to the present exemplary embodiment, the applied ancillary-function-element classification unit 204 is configured to classify an implementation method and an ancillary-function element in order to reconstruct data even when the ancillary-function element is directly applied in a configuring element. Therefore, it is possible for system engineers to perform security function designing not being aware of a differentiation between a security implementation method and an ancillary-function element.

Fourth Exemplary Embodiment

Figure 12:
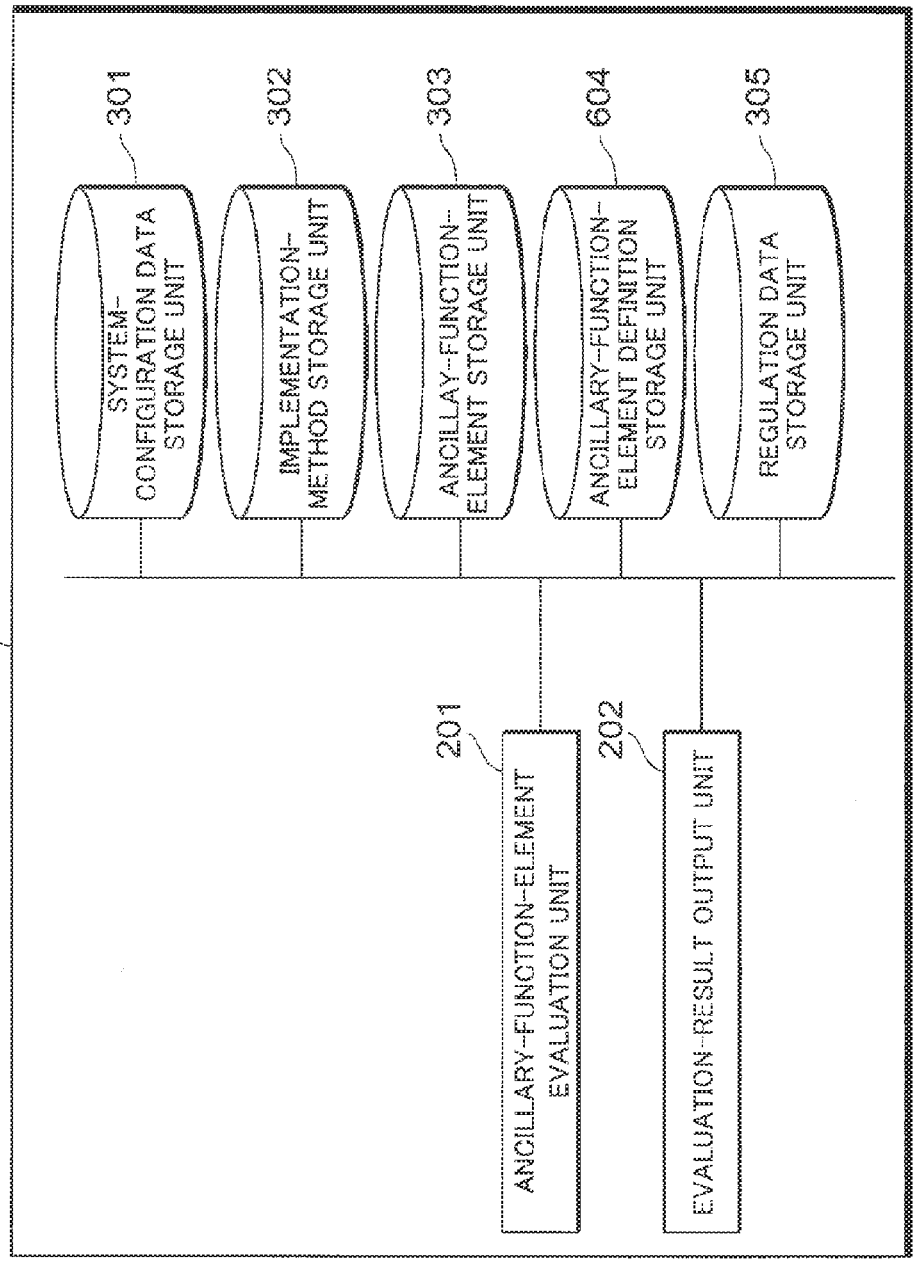
FIG. 12 is a block diagram illustrating a configuration of a security-function-design support device according to a fourth exemplary embodiment of the present invention.

FIG. 12 is a block diagram illustrating a configuration of a security-function-design support device 130 according to a fourth exemplary embodiment of the present invention. The same symbols as in FIG. 1 indicate the same configuring elements. As illustrated in the figure, the security-function-design support device 120 further includes a regulation data storage unit 305. Information stored in an ancillary-function-element definition storage unit 604 is different from the information stored in the ancillary-function-element definition storage unit 304 of the first exemplary embodiment.

FIG. 13 is a chart illustrating an example of data stored in the regulation data storage unit 305. As illustrated in FIG. 13, the regulation data includes an item number 601 and description 602 as data items. The item number 601 refers to an item number of security regulation. The description 602 explains description of each security regulation.

FIG. 14 is a chart illustrating an example of data stored in the ancillary-function-element definition storage unit 604. The same symbols as in FIG. 5 indicate the same items. As illustrated in FIG. 14, a table 637 includes a corresponding regulation item number 636 in addition to the data items of the table 436 of the first exemplary embodiment. The corresponding regulation item number 636 refers to an item number of a security regulation corresponds to each record. When "*" is set for the corresponding regulation item number 636, a corresponding item number is determined to be absent.

The evaluation-result output unit 202 refers to the regulation data storage unit 305 using the corresponding regulation item number 636 of a record of an ancillary-function element having passed as the evaluation result as the key and outputs passed security regulation.

As described above, according to the present exemplary embodiment, when an examination result is output, the examination result is able to show which portion is corresponding to a security regulation.

This application is based upon and claims the benefit of priority from Japanese Patent Application No. 2012-228072, filed on Oct. 15, 2012, the disclosure of which is incorporated herein in its entirety by reference.

While the present invention has been described with reference to exemplary embodiments thereof, the present invention is not limited to these exemplary embodiments. Various modifications understandable to those skilled in the art can be made to the constitution and details of the present invention without departing from the scope of the present invention.

INDUSTRIAL APPLICABILITY

The present invention is applicable, for example, to security function design upon designing for system developments.

A part or all of the exemplary embodiments can be described as the following supplementary notes but are not limited to the following. (Supplementary Note 1) A security-function-design support device including:

a system-configuration data storage unit that stores information indicating a configuration of a system;

an implementation-method storage unit that stores data indicating a security implementation method set for a configuring element of the system in order to implement a security function;

an ancillary-function-element storage unit that stores data indicating an ancillary-function element set for the configuring element of the system in order to ensure a function of the security implementation method;

an ancillary-function-element definition storage unit that stores a condition for determining a suitability of a setting of a given ancillary-function element;

an ancillary-function-element evaluation unit that determines whether the ancillary-function element set for the configuring element of the system is suitable, on the basis of the condition for determining the suitability; and an evaluation-result output unit that outputs a result of the determination by the ancillary-function-element evaluation unit.

(Supplementary Note 2) The security-function-design support device according to Supplementary Note 1, wherein the ancillary-function-element evaluation unit acquires data indicating the ancillary-function element previously set by a user from the implementation-method storage unit, and determines suitability of the ancillary-function element with reference to the information stored in the system-configuration data storage unit and the implementation-method storage unit, on the basis of the condition for determining the suitability acquired from the ancillary-function-element definition storage unit.

(Supplementary Note 3) The security-function-design support device according to Supplementary Note 1 or Supplementary Note 2, further including an ancillary-function-element filtering unit that determines whether to perform an evaluation that whether the ancillary-function element set for the configuring element of the system is suitable, on the basis of a determination condition previously set for each ancillary-function element.

(Supplementary Note 4) The security-function-design support device according to any one of Supplementary Note 1 to Supplementary Note 3, further including an applied ancillary-function-element classification unit that classifies data of the ancillary-function element stored in the ancillary-function-element storage unit into data indicating the security implementation method which is set for the configuring element of the system and data indicating the ancillary-function element which is set for the configuring element of the system.

(Supplementary Note 5) The security-function-design support device according to any one of Supplementary Note 1 to Supplementary Note 4, further including a regulation data storage unit that stores security regulation information previously set for each ancillary-function element, wherein the evaluation-result output unit
outputs the security regulation information related to a passed ancillary-function element as the result of the determination by the ancillary-function-element evaluation unit.

(Supplementary Note 6) The security-function-design support device according to any one of Supplementary Note 1 to Supplementary Note 5, wherein the system-configuration data storage unit includes information indicating configuring elements of a system and other configuring elements to which the each configuring elements is connected via a communication pathway, the implementation-method storage unit includes information indicating an information asset which is to be protected by each security implementation method and a transmission source and a reception destination of the information asset, and the ancillary-function-element evaluation unit,
when an ancillary-function element set for the configuring element of the system in order to ensure the function of the security implementation method is relevant to security maintenance of the communication pathway, determines on the basis of whether the transmission source and the reception destination are connected via the communication pathway with reference to the system-configuration data storage unit.

(Supplementary Note 7) The security-function-design support device according to any one of Supplementary Note 1 to Supplementary Note 5, wherein the implementation-method storage unit includes a record of the other security implementation method linked to a record of the security implementation method when an ancillary-function element set to ensure the function of the security implementation method is implemented by the other security implementation method, and the ancillary-function-element evaluation unit,
when an ancillary-function element set for the configuring element of the system in order to ensure the function of the security implementation method is implemented by the other security implementation method, determines on the basis of whether a record of the other security implementation method linked to the record of the security implementation method exists with reference to the implementation-method storage unit.

(Supplementary Note 8) A security-function-design support method including:

acquiring information indicating a configuration of a system, data indicating a security implementation method set for a configuring element of the system in order to implement a security function, data indicating an ancillary-function element set for the configuring element of the system in order to ensure a function of the security implementation method, and a condition for determining a suitability of a setting of a given ancillary-function element;

determining whether the ancillary-function element set for the configuring element of the system is suitable, on the basis of the condition for determining the suitability; and outputting a result of the determination by the ancillary-function-element evaluation unit.

(Supplementary Note 9) A program that causes a computer to function as:

a system-configuration data storage unit that stores information indicating a configuration of a system;

an implementation-method storage unit that stores data of a security implementation method set for a configuring element of the system in order to implement a security function;

an ancillary-function-element storage unit that stores data of an ancillary-function element set for the configuring element of the system in order to ensure a function of the security implementation method;

an ancillary-function-element definition storage unit that stores a condition for determining a suitability of a setting of a given ancillary-function element;

an ancillary-function-element evaluation unit that determines whether the ancillary-function element set for the configuring element of the system is suitable, on the basis of the condition for determining the suitability; and an evaluation-result output unit that outputs a result of the determination by the ancillary-function-element evaluation unit.

REFERENCE SIGNS LIST 100, 110, 120, 130 security-function-design support device
201 ancillary-function-element evaluation unit
202 evaluation-result output unit 203 ancillary-function-element filtering unit
204 applied ancillary-function-element classification unit
301 system-configuration data storage unit
302 implementation-method storage unit
303 ancillary-function-element storage unit
304, 504, 604 ancillary-function-element definition storage unit
305 regulation data storage unit
401, 411, 421 configuring element name
402 connection destination
412 employed implementation method name
420 handing protection asset
413 transmission source of protection asset
414 reception destination of protection asset
415, 516, 425, 426, 436, 537, 637 table
417, 427, 440, 544 link structure
418, 419, 428, 429, 442, 443, 444, 445 record
422, 431 implementation method name
423, 432 ancillary-function element name
424, 435 sub-implementation method
430, 441 record group
433 handling asset
434 determination rule
437 determination rule index
438 pass condition
439, 542 sub-table
534, 540 evaluation condition
541 determination condition
601 item number
602 description
636 corresponding regulation item number

The invention claimed is:

1. A security-function-design support device comprising:
a processor configured to determine a result based on a security implementation scheme and an ancillary-function definition,
wherein the security implementation scheme is configured to implement a security function of a configurable element of a system, the security implementation scheme being set to the configurable element of the system to protect the information asset in the system,
wherein the ancillary-function definition includes (i) information indicating an ancillary-function element in association with the security implementation scheme to ensure the security implementation scheme and (ii) a condition indicating whether an application of the ancillary-function element to the security implementation scheme is suitable, and
wherein in case the ancillary-function element is ensured by another security implementation scheme, the another security implementation scheme is stored in association with the configurable element and the ancillary-function element;
wherein the result indicates whether the application of the ancillary-function element is suitable for ensuring the security implementation scheme for the configurable element; and
an interface configured to output the result.

2. The security-function-design support device according to claim 1, further comprising:
memory configured to store data including the ancillary-function element for the configurable element of the system and to store the condition for indicating whether the application of the ancillary-function element is suitable,
wherein the processor is configured to determine whether the application of the ancillary-function element for the configurable element of the system is suitable based on the data.

3. The security-function-design support device according to claim 1, wherein the processor is further configured to:
make a determination of the suitability of the application of the ancillary-function element for the configurable element of the system based on the condition,
wherein the condition is predetermined for the ancillary-function element.

4. The security-function-design support device according to claim 1, wherein the processor is further configured to:
classify the ancillary-function element, which is stored in memory, into data indicating the security implementation scheme which is applied for the configurable element of the system and into data indicating the ancillary-function element which is applied for the configurable element of the system.

5. The security-function-design support device according to claim 1, further comprising,
memory configured to:
store security regulation information previously set for the ancillary-function element, wherein
the processor is configured to output the security regulation information via the interface as the result when the ancillary-function element is suitable.

6. The security-function-design support device according to claim 1, further comprising,
memory configured to:
store information indicating a plurality of configurable elements of the system and other configurable elements to which each of the configurable elements is connected via a communication pathway,
store information indicating an information asset which is to be protected by each security implementation scheme and a transmission source and a reception destination of the information asset, and
when the ancillary-function element applied for the configurable element of the system in order to implement the security implementation scheme is relevant to security of the communication pathway, the processor is configured to determine the result based on whether the transmission source and the reception destination are connected via the communication pathway with reference to the memory.

7. The security-function-design support device according to claim 1, further comprising,
memory configured to:
store information corresponding to another security implementation scheme linked to data including the security implementation scheme when the ancillary-function element applied to implement the security implementation scheme is executed by the other security implementation scheme, and
when an ancillary-function element applied for the configurable element of the system in order to implement the security implementation scheme is executed by the other security implementation scheme, the processor is configured to determine the result, based on whether the information corresponding to the other security implementation scheme linked to the data including the security implementation scheme, exists by referring to the memory.

8. A security-function-design support method comprising:
determining a result based on a security implementation scheme and an ancillary-function definition, wherein the security implementation scheme is configured to implement a security function of a configurable element of a system, the security implementation scheme being set to the configurable element of the system to protect the information asset in the system, wherein the ancillary-function definition includes (i) information indicating an ancillary-function element in association with the security implementation scheme to ensure the security implementation scheme and (ii) a condition indicating whether an application of the ancillary-function element to the security implementation scheme is suitable, and wherein in case the ancillary-function element is ensured by another security implementation scheme, the another security implementation scheme is stored in association with the configurable element and the ancillary-function element wherein the result indicates whether the application of the ancillary-function element is suitable for ensuring the security implementation scheme for the configurable element; and outputting the result.

9. A non-transitory computer readable storage medium storing a program that causes a computer to function as:

determining a result based on a security implementation scheme and an ancillary-function definition, wherein the security implementation scheme is configured to implement a security function of a configurable element of a system, the security implementation scheme being set to the configurable element of the system to protect the information asset in the system, wherein the ancillary-function definition includes (i) information indicating an ancillary-function element in association with the security implementation scheme to ensure the security implementation scheme and (ii) a condition indicating whether an application of the ancillary-function element to the security implementation scheme is suitable, and wherein in case the ancillary-function element is ensured by another security implementation scheme, the another security implementation scheme is stored in association with the configurable element and the ancillary-function element;

wherein the result indicates whether the application of the ancillary-function element is suitable for ensuring the security implementation scheme for the configurable element; and outputting the result.

10. The security-function-design support device according to claim 2, wherein the processor is further configured to:

determine whether to perform a determination of the suitability of the application of the ancillary-function element for the configurable element of the system based on the condition, wherein the condition is predetermined for the ancillary-function element.

11. The security-function-design support device according to claim 2, wherein the memory is configured to:

store information indicating a plurality of configurable elements of the system and other configurable elements to which each of the configurable elements is connected via a communication pathway, store information indicating an information asset which is to be protected by each security implementation scheme and a transmission source and a reception destination of the information asset, and when the ancillary-function element applied for the configurable element of the system in order to implement the security implementation scheme is relevant to security of the communication pathway, the processor is configured to determine the result based on whether the transmission source and the reception destination are connected via the communication pathway with reference to the memory.

12. The security-function-design support device according to claim 2, wherein the memory is configured to:

store information corresponding to another security implementation scheme linked to data including the security implementation scheme when the ancillary-function element applied to implement the security implementation scheme is executed by the other security implementation scheme, and when an ancillary-function element applied for the configurable element of the system in order to implement security implementation scheme is executed by the other security implementation scheme, the processor is configured to determine the result, based on whether the information corresponding to the other security implementation scheme linked to the data including the security implementation scheme, exists by referring to the memory.

13. The security-function-design support device according to claim 6, wherein the memory is further configured to:

store information corresponding to another security implementation scheme linked to data including the security implementation scheme when the ancillary-function element applied to implement the security implementation scheme is executed by the other security implementation scheme, and when an ancillary-function element applied for the configurable element of the system in order to implement security implementation scheme is executed by the other security implementation scheme, the processor is configured to determine the result, based on whether the information corresponding to the other security implementation scheme linked to the data including the security implementation scheme, exists by referring to the memory.

* * * * *